United States Patent

Sumi

[11] Patent Number: 5,938,559
[45] Date of Patent: Aug. 17, 1999

[54] SPEED CHANGE GEAR MECHANISM OF AUTOMATIC TRANSMISSION

[75] Inventor: Yasuo Sumi, Kanagawa, Japan

[73] Assignee: JATCO Corporation, Fuji, Japan

[21] Appl. No.: 08/889,596

[22] Filed: Jul. 8, 1997

[30] Foreign Application Priority Data

Jul. 16, 1996 [JP] Japan ................................ 8-186068

[51] Int. Cl.$^6$ .................................................. F16H 3/66
[52] U.S. Cl. ......................................................... 475/278
[58] Field of Search ................................. 475/276, 277, 475/278

[56] References Cited

U.S. PATENT DOCUMENTS

| | | | |
|---|---|---|---|
| 3,811,343 | 5/1974 | Mori et al. | 475/276 |
| 5,083,992 | 1/1992 | Asada | 475/278 |
| 5,098,357 | 3/1992 | Asada et al. | 475/278 |
| 5,122,103 | 6/1992 | Nakawaki et al. | 475/278 |

FOREIGN PATENT DOCUMENTS

7-4478   1/1995   Japan .
2 272 735  5/1994  United Kingdom .

*Primary Examiner*—Dirk Wright
*Attorney, Agent, or Firm*—Foley & Lardner

[57] ABSTRACT

A speed change gear mechanism of an automatic transmission comprising first, second and third planetary gear units each including a sun gear, a ring gear, a single pinion meshed with both the sun gear and the ring gear and a pinion carrier for carrying the pinion. The pinion carrier of the first unit is united with the ring gear of the third unit. The ring gear of the second unit is united with the pinion carrier of the third unit. A first clutch is arranged between the ring gear of the first unit and the ring gear of the second unit. A second clutch or direct connecting member is arranged between the sun gear of the second unit and the sun gear of the third unit. A third clutch is arranged between the sun gear of the third unit and the pinion carrier of the third unit. A first brake is used for stopping rotation of the ring gear of the second unit and the pinion carrier of the third unit which are united. A second brake is used for stopping rotation of the sun gear of the first unit. A third brake is used for stopping the sun gear of the second unit. An input shaft is connected to the ring gear of the first unit to rotate therewith. An output shaft is connected to the pinion carrier of the second unit to rotate therewith.

14 Claims, 12 Drawing Sheets

|      | C1 | C2 | C3 | B1 | B2 | B3 | B4 | F1 | F2 | F3 | GEAR RATIO |
|------|----|----|----|----|----|----|----|----|----|----|------------|
| 1st  |    | ●  |    |    | ●  | ●  | ○  | ○  | ○  | ○  | 3.720(3.547) |
| 2nd  |    |    | ○  |    | ●  | ●  | ○  |    | ○  | ○  | 2.400(2.326) |
| 3rd  |    | ○  | ○  |    | ●  |    | ○  |    | ○  |    | 1.600(1.525) |
| 4th  | ○  | ○  | ○  |    |    |    | ○  |    |    |    | 1.000(1.000) |
| 5th  | ○  | ○  |    |    | ○  |    | ○  |    |    |    | 0.815(0.816) |
| Rev  |    | ●  |    | ○  | ●  |    |    | ○  | ○  |    | 2.640(2.326) |

|      | C1 | C3 | B1 | B2 | B3 | B4 | F2 | F3 | GEAR RATIO |
|------|----|----|----|----|----|----|----|----|------------|
| 1st  |    |    |    | ●  | ●  | ○  | ○  | ○  | 2.916      |
| 2nd  |    | ○  |    | ●  |    | ○  | ○  |    | 1.600      |
| 3rd  | ○  | ○  |    |    |    | ○  |    |    | 1.000      |
| 4th  | ○  |    |    | ○  |    | ○  |    |    | 0.783      |
| Rev  |    |    | ○  | ●  |    |    | ○  |    | 2.160      |

|     | C1 | C2 | C3 | B1 | B2 | B3 | F1 | F2 | GEAR RATIO |
|-----|----|----|----|----|----|----|----|----|------------|
| 1st |    | ●  |    |    | ●  | ●  | ○  | ○  | 3.584      |
| 2nd |    | ●  | ○  |    |    | ●  | ○  |    | 2.240      |
| 3rd | ○  |    | ○  |    |    | ○  |    |    | 1.400      |
| 4th | ○  | ○  | ○  |    |    |    |    |    | 1.000      |
| 5th | ○  | ○  |    |    | ○  |    |    |    | 0.848      |
| Rev |    | ●  |    | ○  | ●  |    | ○  | ○  | 3.360      |

FIG.20
(PRIOR ART)

SPEED CHANGE GEAR MECHANISM OF AUTOMATIC TRANSMISSION

BACKGROUND OF THE INVENTION

1. Field of the Invention

The present invention relates in general to automatic transmissions of motor vehicles, and more particularly to speed change gear mechanisms of the automatic transmissions. More specifically, the present invention is concerned with the speed change gear mechanisms of a type which, with three single pinion type planetary gear units and a smaller number of engaging elements, can provide five forward speed modes without usage of a so-called double switch operation. The double switch operation is a phenomenon wherein three or more engaging elements (viz., clutches and brakes) are subjected to engagement/releasement switch or releasement/engagement switch during shift-up or shiftdown operation.

2. Description of the Prior Art

Hitherto, various types of speed change gear mechanisms of automatic transmission have been proposed. Some of them are of a type which, with three single pinion type planetary gear units and a smaller number of engaging elements, can provide five forward speed modes without usage of the double switch operation. In all the planetary gear units, ring gears serve as power input means. One of the gear mechanisms of such type is disclosed in Japanese Patent First Provisional Publication 7-4478.

Figure 18:
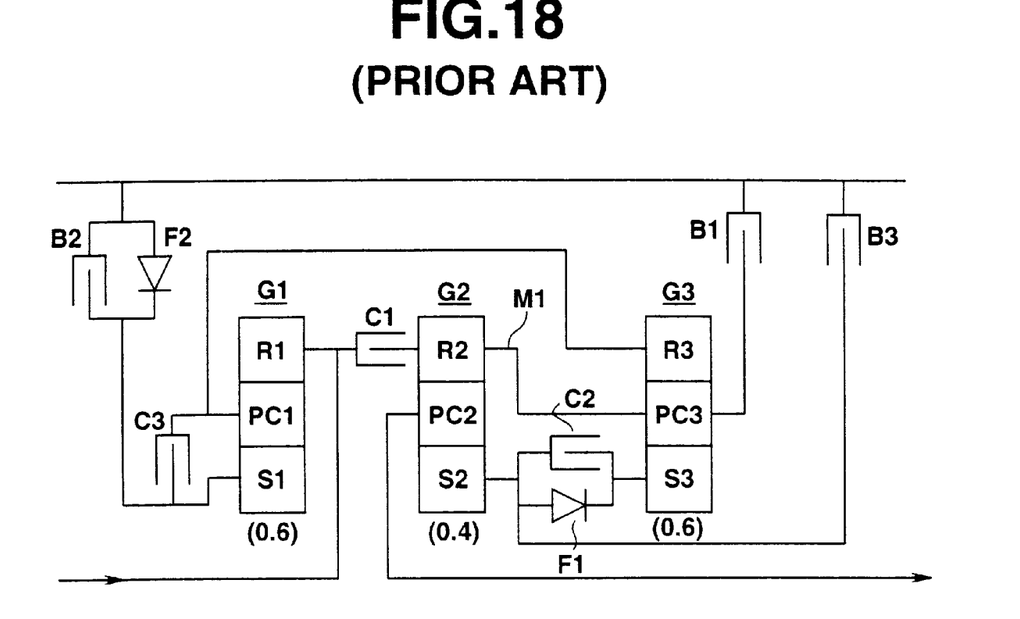
FIG. 18 is a diagrammatic view of a conventional speed change gear mechanism of an automatic transmission.
Figure 19:
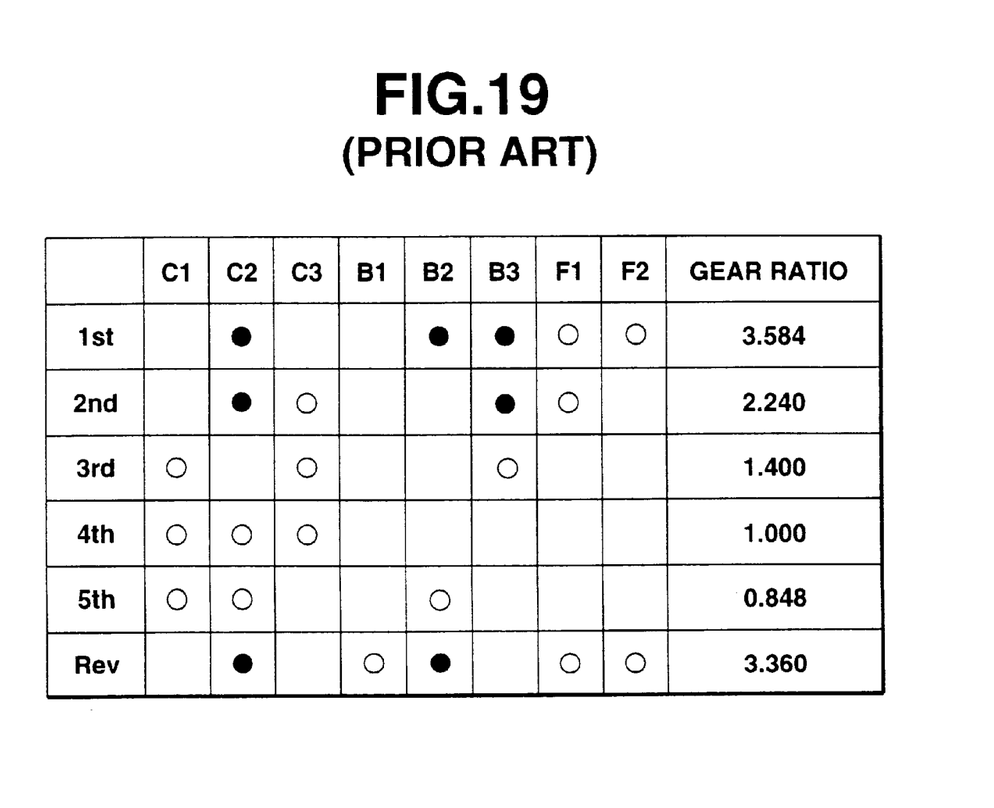
FIG. 19 is an ELEMENT ON/OFF CONDITION TABLE showing ON/OFF condition of each engaging element of the conventional speed change gear mechanism.
Figure 20:
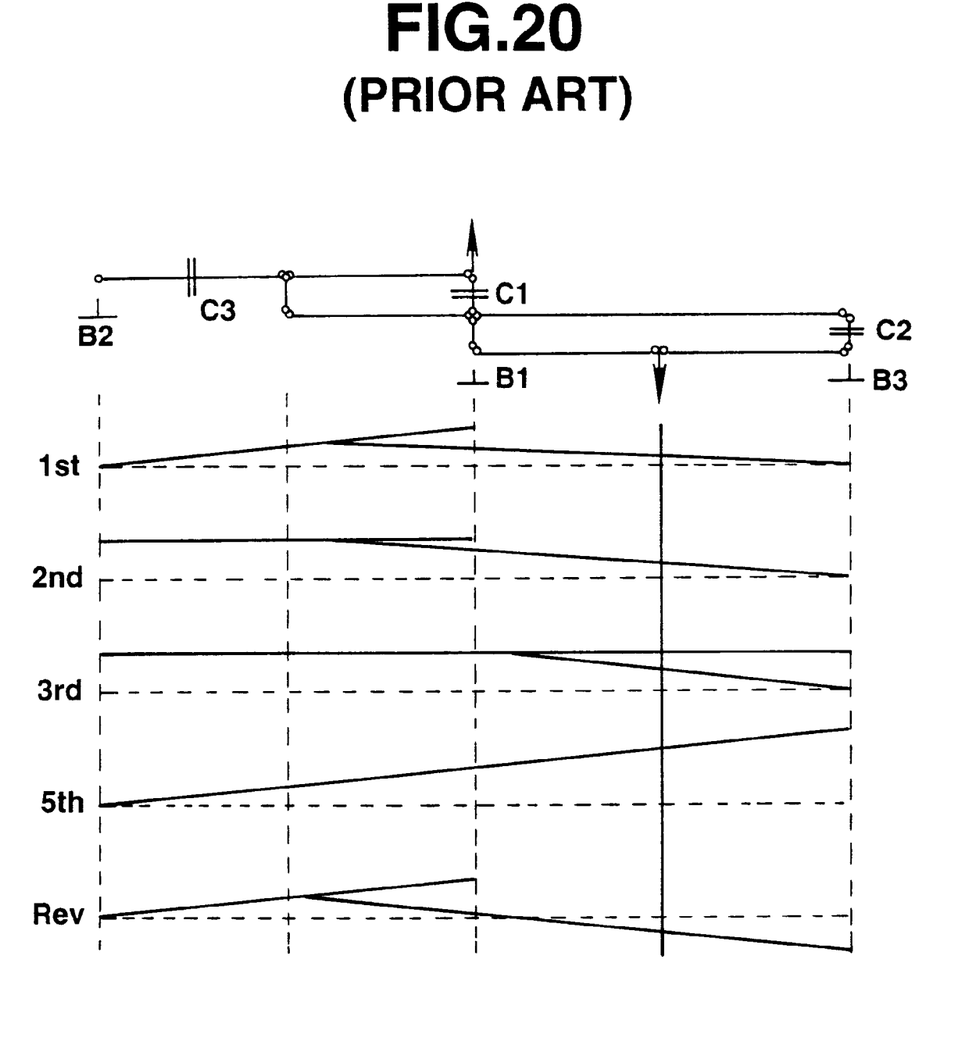
FIG. 20 is an ELEMENT SPEED DIAGRAM showing rotation speed of each rotatable member of the conventional speed change gear mechanism.

In order to clarify the task of the present invention, the gear mechanism of the publication will be briefly described with an aid of FIGS. 18, 19 and 20 of the accompanying drawings.

FIG. 18 shows the conventional gear mechanism in diagrammatic form. The gear mechanism comprises three single pinion type planetary gear units G1, G2 and G3 each having a ring gear which serves as a power input means, two ON/OFF clutches C1 and C2 (viz., first and second clutches), a lock clutch C3 (viz., third clutch) and three brakes B1, B2 and B3. That is, this gear mechanism has six absolutely necessary engaging elements. As is seen from the ELEMENT ON/OFF CONDITION TABLE of FIG. 19, the gear mechanism has five forward speed modes and one reverse mode without usage of the double switch operation. In the TABLE of FIG. 19, black circles indicate a condition of the corresponding engaging element wherein ON operation of the element does not contribute to a practical power transmission being carried out by the gear mechanism. As is seen from the ELEMENT SPEED DIAGRAM of FIG. 20, in all forward and reverse modes, there is no one in the six engaging elements, which, under its idling operation, exhibits a rotation speed higher than that of an input shaft.

However, due to inherent construction, the speed change gear mechanism has the following drawbacks.

That is, in the gear mechanism, the third clutch C3 is a lock clutch which selectively engages a first sun gear S1 or a first pinion carrier PC1. For achieving a third forward speed mode, the third clutch C3 is engaged and the second clutch C2 which selectively engages a second sun gear S2 or a third sun gear S3 is disengaged. Thus, in a gear mechanism adopting the basic structure of the above-mentioned gear mechanism, a fourth forward speed mode is theoretically achieved by uniting the second and third sun gears S2 and S3 canceling the second clutch C2. However, in fact, such fourth forward speed mode is not practical in view of gear ratios actually set.

That is, in speed change gear mechanisms of automatic transmission, a practical value of the gear ratio of a planetary gear unit (viz., ratio between the number of teeth of sun gear and that of ring gear) is about 0.35 to about 0.65. However, even when such practical gear ratios of the three planetary gear units are provided, practical gear ratios for first and second forward speed modes are not achieved. In fact, practical gear ratios for such first and second forward speed modes are about 2.9 and about 1.6 respectively.

Furthermore, when the gear ratios $\alpha 1$, $\alpha 2$ and $\alpha 3$ of the three planetary gear units G1, G2 and G3 are set to the same value, desired respective gear ratios for the five forward speed modes are not obtained. In fact, in this case, the change rate of the gear ratios throughout the first to the fifth forward speed mode fails to have a constant value. It is to be noted that the gear ratios shown in the TABLE of FIG. 19 are those provided when the gear ratios $\alpha 1$, $\alpha 2$ and $\alpha 3$ of the three planetary gear units G1, G2 and G3 are 0.6, 0.4 and 0.6 respectively.

SUMMARY OF THE INVENTION

It is therefore an object of the present invention to provide a speed change gear mechanism of an automatic transmission, which is free of the above-mentioned drawbacks.

According to the present invention, there is provided a speed change gear mechanism of an automatic transmission, which is constructed to five forward speed modes and easily remodeled to have four forward speed modes.

According to the present invention, there is provided a speed change gear mechanism of an automatic transmission, which has such features that three planetary gear units used are of a single pinion type, ring gears of these units serve as power input means, the number of absolutely necessary engaging elements is relatively small, low cost, light weight and compact construction is achieved and undesired double switch operation is not used.

According to the present invention, there is provided a speed change gear mechanism of an automatic transmission which comprises a first planetary gear unit including a first sun gear, a first ring gear, a first single pinion meshed with both the first sun gear and the first ring gear and a first pinion carrier for carrying the first single pinion; a second planetary gear unit including a second sun gear, a second ring gear, a second single pinion meshed with both the second sun gear and the second ring gear and a second pinion carrier for carrying the second single pinion; a third planetary gear unit including a third sun gear, a third ring gear, a third single pinion meshed with both the third sun gear and the third ring gear and a third pinion carrier for carrying the third single pinion; a first direct connecting member for integrally connecting the first pinion carrier and the third ring gear; a second direct connecting member for integrally connecting the second ring gear and the third pinion carrier; a first clutch for selectively establishing and canceling a united connection between the first ring gear and the second ring gear; power transmitting means for establishing a united connection between the second sun gear and the third sun gear; a third clutch for selectively establishing and canceling a united connection between the third sun gear and the third pinion carrier; a first brake for selectively stopping and permitting a rotation of the second direct connecting member; a second brake for selectively stopping and permitting a rotation of the fist sun gear; a third brake for selectively stopping and permitting a rotation of the second sun gear; an input shaft connected to the first ring gear to rotate therewith; and an output shaft connected to the second pinion carrier to rotate therewith.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
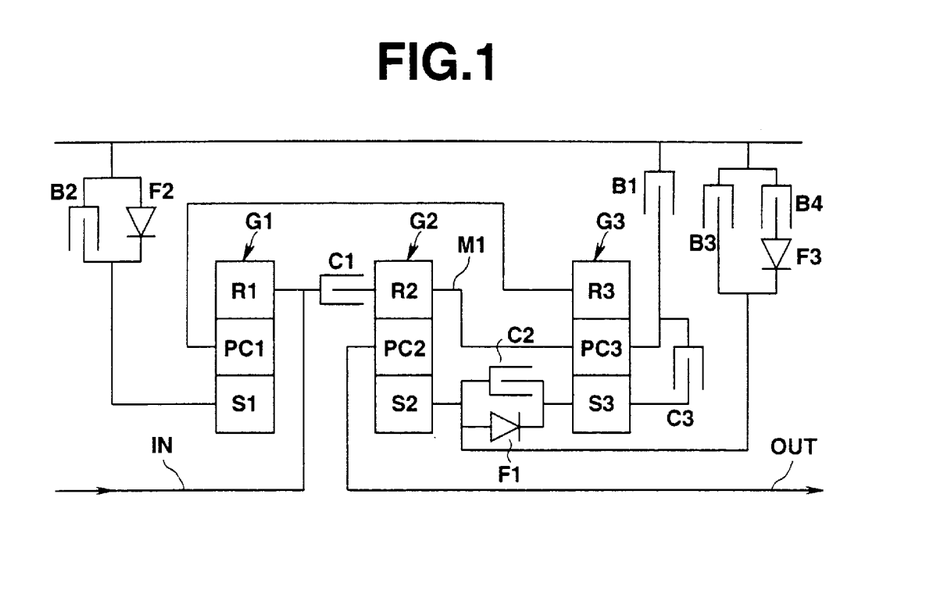
FIG. 1 is a diagrammatic view of a speed change gear mechanism which is a first embodiment of the present invention.
Figure 9:
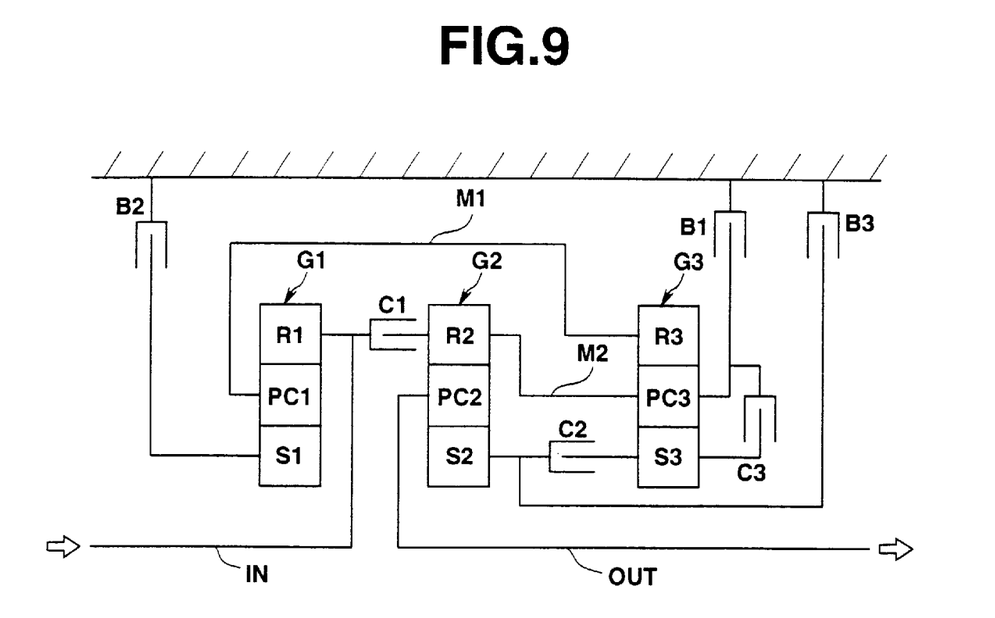
FIG. 9 is a view similar to FIG. 1, but showing only absolutely necessary engaging elements of the first embodiment.

Referring to FIGS. 1 and 9, there is shown, in diagrammatic form, a speed change gear mechanism of an automatic transmission, which is a first embodiment of the present invention. It is to be noted that FIG. 9 shows only absolutely necessary engaging elements of the first embodiment.

As is seen from FIG. 1, the gear mechanism comprises first, second and third planetary gear units G1, G2 and G3, first and second direct connecting members M1 and M2, first, second and third clutches C1, C2 and C3, first, second, third and fourth brakes B1, B2, B3 and B4, first, second and third one-way clutches F1, F2 and F3, an input shaft IN and an output shaft OUT.

The first planetary gear unit G1 is of a single pinion type, which comprises a first sun gear S1, a first ring gear R1, a pinion meshed with both the sun gear S1 and the ring gear R1 and a first pinion carrier PC1.

The second planetary gear unit G2 is of a single pinion type, which comprises a second sun gear S2, a second ring gear R2, a pinion meshed with both the sun gear S2 and the ring gear R2 and a second pinion carrier PC2.

The third planetary gear unit G3 is also of a single pinion type, which comprises a third sun gear S3, a third ring gear R3, a pinion meshed with both the sun gear S3 and the ring gear R3 and a third pinion carrier PC3.

The first direct connecting member M1 is a member for integrally connecting the first pinion carrier PC1 and the third ring gear R3.

The second direct connecting member M2 is a member for integrally connecting the second ring gear R2 and the third pinion carrier PC3.

The first clutch C1 is a clutch for selectively establishing and canceling a united connection between the first ring gear R1 and the second ring gear R2.

The second clutch C2 is a clutch for selectively establishing and canceling a united connection between the second sun gear S2 and the third sun gear S3. The first one-way clutch F1 is arranged in parallel with the second clutch C2.

The third clutch C3 is a clutch for selectively establishing and canceling a united connection between the third pinion carrier PC3 and the third sun gear S3.

The first brake B1 is a brake for selectively stopping and permitting rotation of the second direct connecting member M2.

The second brake B2 is a brake for selectively stopping and permitting rotation of the first sun gear S1. The second one-way clutch F2 is arranged in parallel with the second brake B2.

The third brake B3 is a brake for selectively stopping and permitting rotation of the second sun gear S2. A series arrangement including the fourth brake B4 and the third one-way clutch F3 is arranged in parallel with the third brake B3.

The input shaft IN is integrally connected to the first ring gear R1, so that output of a torque converter (not shown) is fed to the first ring gear R1 through the input shaft IN.

The output shaft OUT is integrally connected to the second pinion carrier PC2, so that output of the gear mechanism is fed to drive wheels (not shown) through a final gear (not shown).

The first, second and third clutches C1, C2 and C3 and the first, second, third and fourth brakes B1, B2, B3 and B4 are controlled by electronically controlled hydraulic actuators or the like.

Figure 2:
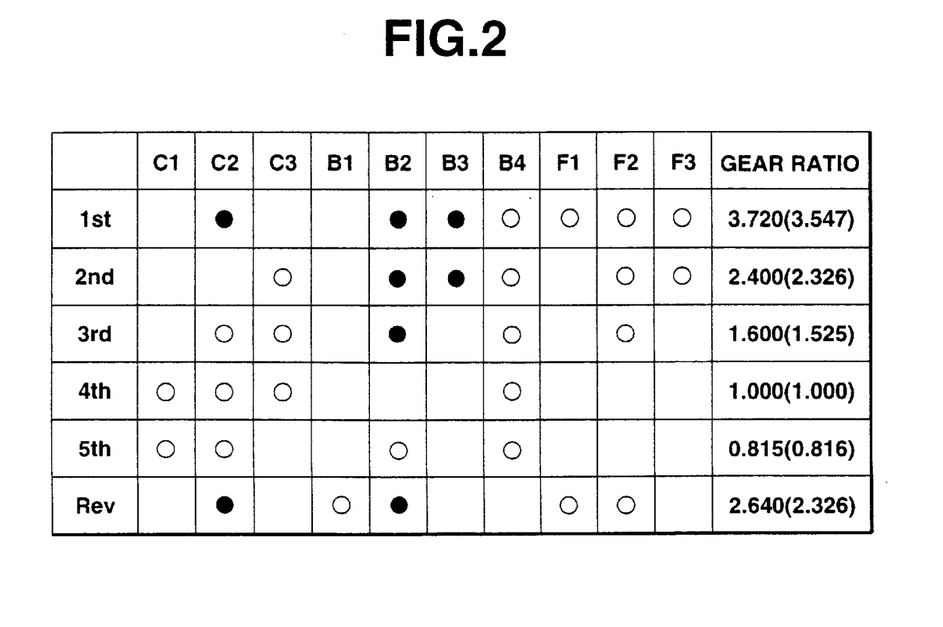
FIG. 2 is an ELEMENT ON/OFF CONDITION TABLE showing ON/OFF condition of each engaging element of the speed change gear mechanism of the first embodiment under various operation modes of the mechanism.
Figure 3:
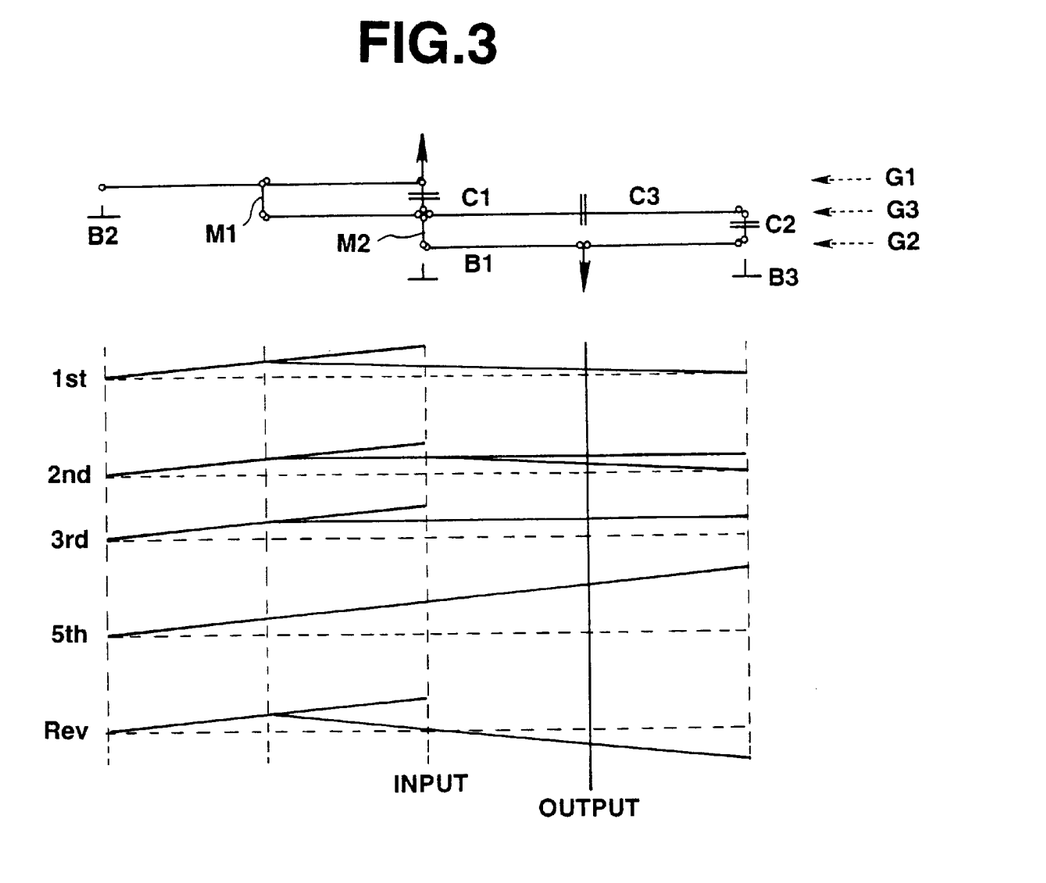
FIG. 3 is an ELEMENT SPEED DIAGRAM showing rotation speed of each rotatable member of the speed change gear mechanism of the first embodiment under various operation modes of the mechanism.

In the following, operation of the speed change gear mechanism of the first embodiment will be described with reference to FIGS. 2 to 8 and 9 of the drawings. FIG. 2 is an ELEMENT ON/OFF CONDITION TABLE showing ON/OFF condition of each engaging element established in various operation modes of the gear mechanism. It is to be noted that black circles in the TABLE indicate a condition of the corresponding engaging element wherein ON operation of the element does not contribute to a practical power transmission being carried out in a direction from the input shaft IN to the output shaft OUT. FIG. 3 is an ELEMENT SPEED DIAGRAM showing rotation speed of each rotatable member under various operation modes of the gear mechanism. In FIGS. 4 to 8, operative paths (viz., operative gear train) are illustrated by heavy lines.

Figure 4:
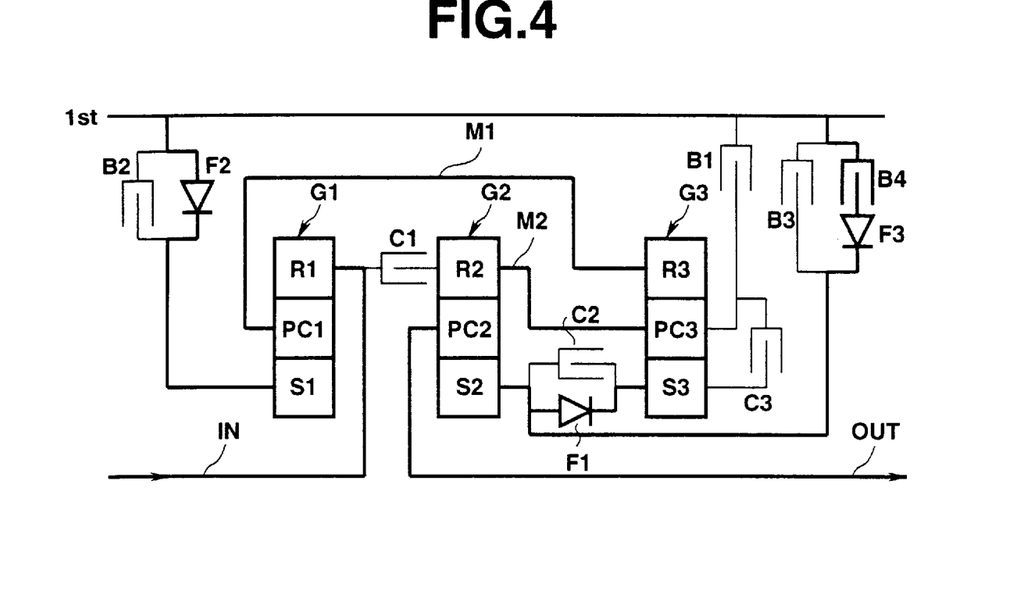
FIG. 4 is a view similar to FIG. 1, but showing a torque transmitting path established in a first forward speed mode of the first embodiment.

For ease of understanding, the description of operation will be commenced with respect to a first forward speed mode obtained by the gear mechanism, which is depicted by FIG. 4.

As is seen from the TABLE of FIG. 2, in the first forward speed mode, the second clutch C2, the second brake B2, third brake B3 and the fourth brake B4 are in their engaged (or ON) conditions.

As is understood from FIG. 3 and FIG. 4, particularly FIG. 4, in this first forward speed mode, due to ON-operation of the second one-way clutch F2 or engagement of the second brake B2, the first sun gear S1 is fixed to the transmission case, and due to releasement of the first clutch C1, engagement between the first ring gear R1 and the second ring gear R2 is canceled. Furthermore, due to ON-operation of the first one-way clutch F1 or engagement of the second clutch C2, the second sun gear S2 and the third sun gear S3 are united, and due to engagement of the fourth brake B4 and ON-operation of the third one-way clutch F3 or due to engagement of the third brake B3, both the second and third sun gears S2 and S3 are fixed to the transmission case.

Accordingly, rotation of the output shaft OUT is controlled by the rotation of the second ring gear R2 and the fixed condition of the second sun gear S2. It is to be noted that rotation speed of the second ring gear R2 is lower than that of the first direct connecting member M1. That is, in this condition, a great speed reduction is applied to the input rotation to provide the first forward speed.

As is seen from the TABLE of FIG. 2, a second forward speed mode is obtained from the first forward speed mode by releasing the second clutch C2 and engaging the third clutch C3. As is understood from FIG. 3 and FIG. 5, in this second forward speed mode, due to ON-operation of the second one-way clutch F2 or engagement of the second brake B2, the first sun gear S1 is fixed to the transmission case, and due to releasement of the first clutch C1, engagement between the first ring gear R1 and the second ring gear R2 is canceled. Furthermore, due to releasement of the second clutch C2 and engagement of the third clutch C3, the third planetary gear unit G3 forms a block and thus integrally rotates. Furthermore, due to engagement of the fourth brake B4 and ON-operation of the third one-way clutch F3 or due to engagement of the third brake B3, the second sun gear S2 is fixed to the transmission case.

Figure 5:
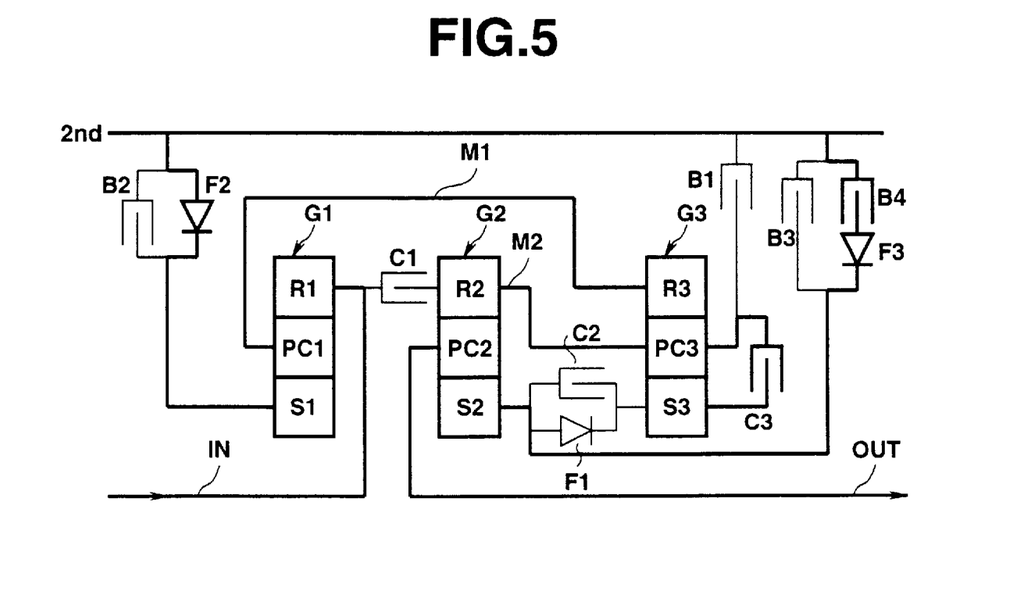
FIG. 5 is a view similar to FIG. 1, but showing a torque transmitting path established in a second forward speed mode of the first embodiment.

Accordingly, rotation of the output shaft OUT is controlled by the rotation of the second ring gear R2 and the stop condition of the second sun gear S2. It is to be noted that the rotation speed of the second ring gear R2 is the same as that of the first direct connecting member M1. That is, in this condition, a speed reduction is applied to the input rotation to provide the second forward speed.

As is seen from the TABLE of FIG. 2, a third forward speed mode is obtained from the second forward speed mode by releasing the third brake B3 and engaging the second clutch C2. As is understood from FIG. 3 and FIG. 6, in this third speed mode, due to ON-operation of the second one-way clutch F2 or engagement of the second brake B2, the first sun gear S1 is fixed to the transmission case, and due to releasement of the first clutch C1, engagement between the first ring gear R1 and the second ring gear R2 is canceled. Furthermore, due to engagement of the second clutch C2 and that of the third clutch C3, the second planetary gear unit G2 and the third planetary gear unit G3 form one block and thus integrally rotate.

Figure 6:
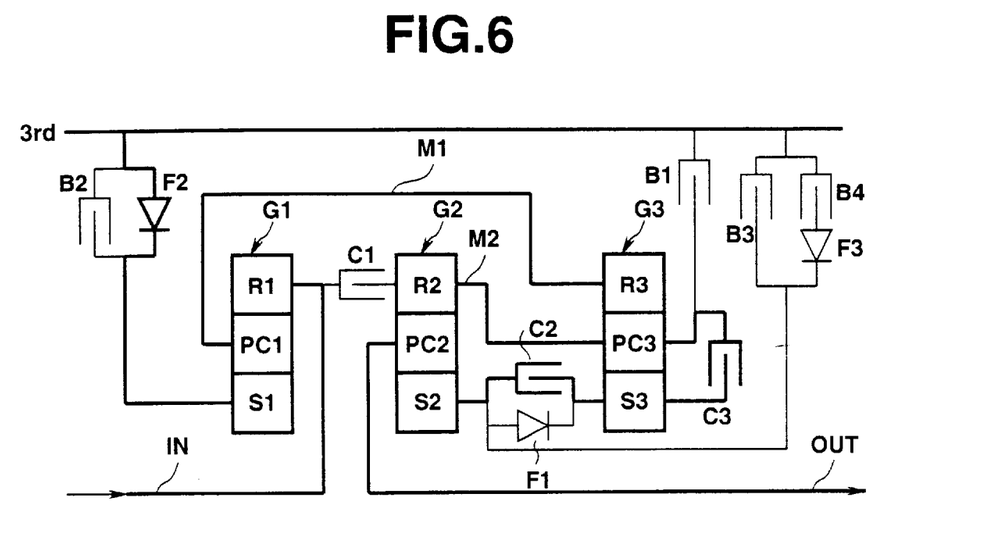
FIG. 6 is a view similar to FIG. 1, but showing a torque transmitting path established in a third forward speed mode of the first embodiment.

Accordingly, rotation of the output shaft OUT is controlled by the rotation of the second ring gear R2 and the rotation of the second sun gear S2. It is to be noted that the rotation speed of the second ring gear R2 and that of the second sun gear S2 are the same as that of the first direct connecting member M1. Thus, the rotation speed of the output shaft OUT is controlled to the same level as the first direct connecting member M1. That is, in this condition, a speed reduction is applied to the input rotation by only the first planetary gear unit G1 to provide the third forward speed.

As is seen from the TABLE of FIG. 2, a fourth forward speed mode is obtained from the third forward speed mode by releasing the second brake B2 and engaging the first clutch C1. In this fourth forward speed mode, due to engagement of the first clutch C1, the first ring gear R1 and the second ring gear R2 are united. Furthermore, due to engagement of the second clutch C2 and engagement of the third clutch C3, the second planetary gear unit G2 and the third planetary gear unit G3 form one block and thus integrally rotate.

Accordingly, a so-called direct connection between the input shaft IN and the output shaft OUT is established. Thus, in this condition, the fourth forward speed is obtained with a gear ratio being 1.000.

As is seen from the TABLE of FIG. 2, a fifth forward speed mode is obtained from the fourth forward speed mode by releasing the third clutch C3 and engaging the second brake B2. As is seen from FIG. 3 and FIG. 7, in this fifth forward speed mode, due to engagement of the second brake B2 or ON-operation of the second one-way clutch F2, the first sun gear S1 is fixed to transmission case, and due to engagement of the first clutch C1, the first and second ring gears R1 and R2 are united. Furthermore, due to ON-operation of the first one-way clutch F1 or engagement of the second clutch C2 and due to releasement of the third clutch C3, the second and third sun gears S2 and S3 are united.

Figure 7:
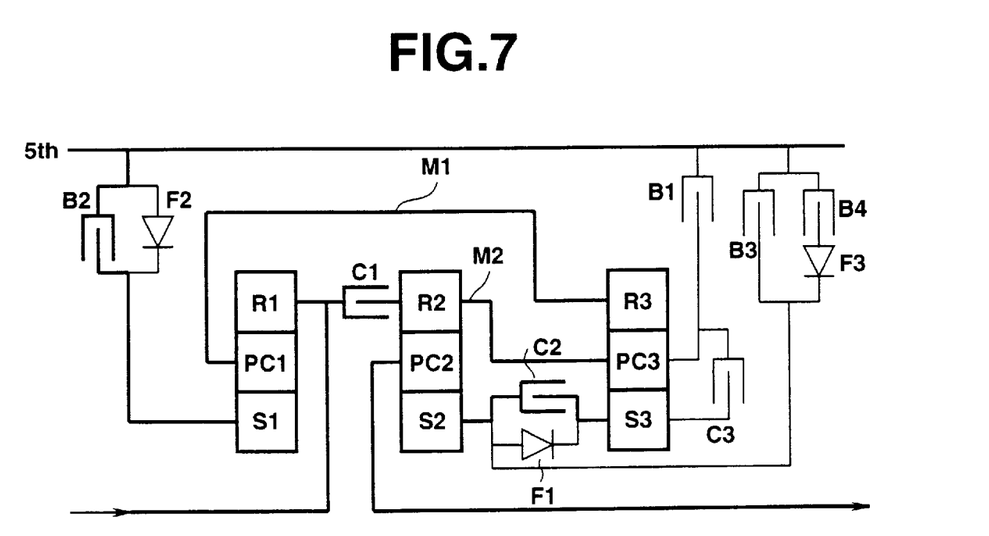
FIG. 7 is a view similar to FIG. 1, but showing a torque transmitting path established in a fifth forward speed mode of the first embodiment.

Accordingly, rotation of the output shaft OUT is controlled by the rotation of the second ring gear R2 and the rotation of the second sun gear S2. It is to be noted that the rotation speed of the second ring gear R2 is the same as that of the input shaft IN and the rotation speed of the second sun gear S2 is higher than that of the input shaft IN. Thus, in this condition, a speed acceleration is applied to the input rotation to provide the fifth forward speed.

As is seen from the TABLE of FIG. 2, a reverse mode is provided by engaging the second clutch C2, the first brake B1 and the second brake B2. As is understood from FIG. 3 and FIG. 8, in this reverse mode, due to ON-operation of the second one-way clutch F2 or engagement of the second brake B2, the first sun gear S1 is fixed to the transmission case, and due to releasement of the first clutch C1, engagement between the first ring gear R1 and the second ring gear R2 is canceled. Furthermore, due to ON-operation of the first one-way clutch F1 or engagement of the second clutch C2, the second sun gear S2 and the third sun gear S3 are integrated, and due to engagement of the first brake B1, the second direct connecting member M2 is fixed to the transmission case.

Figure 8:
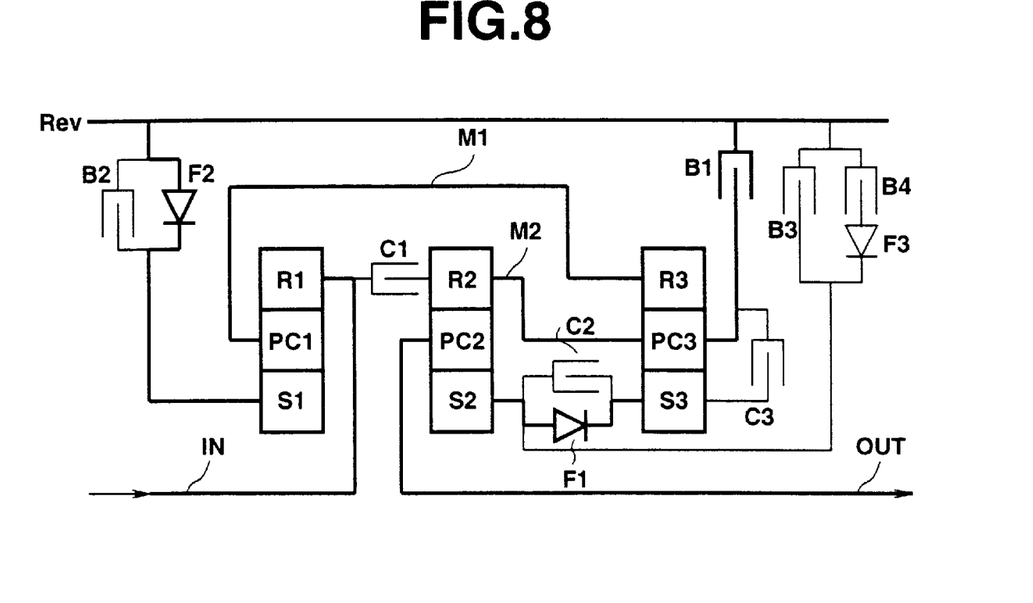
FIG. 8 is a view similar to FIG. 1, but showing a torque transmitting path established in a reverse mode of the first embodiment.

Accordingly, rotation of the output shaft OUT is controlled by the fixed condition of the second ring gear R2 and a reversed rotation of the second sun gear S2. Thus, in this condition, the output shaft OUT is rotated in a reversed direction thereby to provide the reverse mode.

In the following, advantages of the above-mentioned first embodiment will be described.

First, the number of engaging elements used is relatively small. That is, as is understood from FIGS. 1, 2 and 9, in this embodiment, the number of engaging elements which are absolutely necessary is six, which are the elements C1, C2, C3, B1, B2 and B3 (see FIG. 9), and the number of engaging elements which are added for simplifying control of the speed change operation is four, which are the elements B4, F1, F2 and F3. That is, the five forward speed modes and one reverse mode are obtained with ten engaging elements in total. Although the number (viz., ten) of the engaging elements of this first embodiment is greater than that (viz., eight) of the above-mentioned conventional gear mechanism of FIG. 18, the size, weight and cost of the gear mechanism can be reduced to satisfied ones by making suitable improvements in the layout of parts of the mechanism. The planetary gear units G1, G2 and G3 used in this embodiment are of a single pinion type. This brings about a lighter weight of the gear mechanism and thus improves the fuel consumption of an associated motor vehicle. All of the ring gears R1, R2 and R3 of the three planetary gear units G1, G2 and G3 serve as power input means. This brings about a compact construction of the gear mechanism. This is because of an effectively longer distance obtained between an axis of each planetary gear unit and a meshed portion of two gears as compared with a case wherein a pinion carrier or a sun gear serves as power input means. In fact, the longer distance can reduce a load applied to the gears, and thus reduce the size of the sun gear and thus the entire construction of the planetary gear unit. If electronically controlled hydraulic actuators are used for adjusting the gear change timings, the four elements B4, F1, F2 and F3 or at least some of them can be removed. FIG. 9 shows the gear mechanism including only the six absolutely necessary engaging elements C1, C2, C3, B1, B2 and B3.

Second, the speed change operation of the gear mechanism can be smoothly achieved. That is, in this first embodiment, undesired double switch operation is not used. The double switch operation is a phenomenon wherein for effecting up-shift or down-shift, three or more engaging elements (such as clutches and brakes) are subjected to engagement/releasement switch or releasement/engagement switch. As is known, the double switch operation tends to induce mistimed engaging and releasing operations of the engaging elements, which causes the undesired shift shock. As is seen from the TABLE of FIG. 2, in the first embodiment, only two engaging elements are subjected to engagement/releasement switch or releasement/engagement switch throughout entire speed modes. That is, between the first and second forward speed modes, the second and third clutches C2 and C3 are subjected to such switch. Between the second and third forward speed modes, the second clutch C2 and the third brake B3 are subjected to such switch. Between the third and fourth forward speed modes, the first clutch C1 and the second brake B2 are subjected to such switch, and between the fourth and fifth forward speed modes, the third clutch C3 and the second brake B2 are subjected to the switch.

Third, it is easy to remodel the gear mechanism to a type which provides four forward speed modes. For this remodeling, the second clutch C2 is controlled to be a constantly engaged element, and the first, third, fourth and fifth forward speed modes depicted in the TABLE of FIG. 2 are used as first, second, third and fourth forward speed modes. It is to be noted that this remodeling does not need changing of the speed change rule shown in the TABLE. In case wherein the gear ratios $\alpha 1$, $\alpha 2$ and $\alpha 3$ of the first, second and third planetary gear units G1, G2 and G3 are set to 0.6, 0.35 and 0.35 respectively, the gear ratios for the first, second, third and fourth forward speed modes and one reverse mode become 2.916, 1.600, 1.000, 0.783 and 2.160 respectively. As is easily known, these values are practical gear ratios in a speed change gear mechanism of automatic transmissions.

For clarifying this advantage of the first embodiment, a case wherein the conventional gear mechanism of FIG. 18 is remodeled to the type having the four forward speed modes will be considered. In this remolding, the second clutch C2 (see the TABLE of FIG. 19) is controlled to be a constantly engaged element, and the first, second, fourth and fifth forward speed modes depicted in the TABLE are used as first, second, third and fourth forward speed modes. However, even when various possible combinations of the gear ratios (viz., from 0.35 to 0.65) possessed by the first, second and third planetary gear units G1, G2 and G3 are put into consideration, it is impossible to gain practical gear ratios for the first, second, third and fourth forward speed modes.

Fourth, it is easy to set the gear ratios of the first, second and third planetary gear units G1, G2 and G3 for obtaining the desired gear ratios for the first, second, third, fourth and fifth forward speed modes. That is, when the gear ratios $\alpha 1$, $\alpha 2$ and $\alpha 3$ of the first, second and third planetary gear units G1, G2 and G3 are set to 0.6, 0.5 and 0.55 respectively, optimum gear ratios for the five forward speed modes are provided, which are 3.720, 2.400, 1.600, 1.000 and 0.815, as is shown in the TABLE of FIG. 2. Furthermore, when the gear ratios $\alpha 1$, $\alpha 2$ and $\alpha 3$ of the planetary gear units G1, G2 and G3 are all set to 0.525, practical gear ratios for the five forward speed modes are also obtained, which are 3.547, 2.326, 1.525, 1.000 and 0.816, as is shown in the bracketed part of the TABLE of FIG. 2. It is to be noted that when the first, second and third planetary gear units G1, G2 and G3 of the conventional gear mechanism of FIG. 18 are set to have the same gear ratio, practical gear ratios for the five forward speed modes are not provided. It is now to be noted that the gear ratios shown in the TABLE of FIG. 19 are those set when the gear ratios $\alpha 1$, $\alpha 2$ and $\alpha 3$ of the three planetary gear units G1, G2 and G3 are set to 0.6, 0.4 and 0.6 respectively.

Fifth, due to unique arrangement of the third clutch C3, practical gear ratios for the five forward speed modes become possible even when the gear ratios α1, α2 and α3 of the three planetary gear units G1, G2 and G3 are the same.

Figure 10:
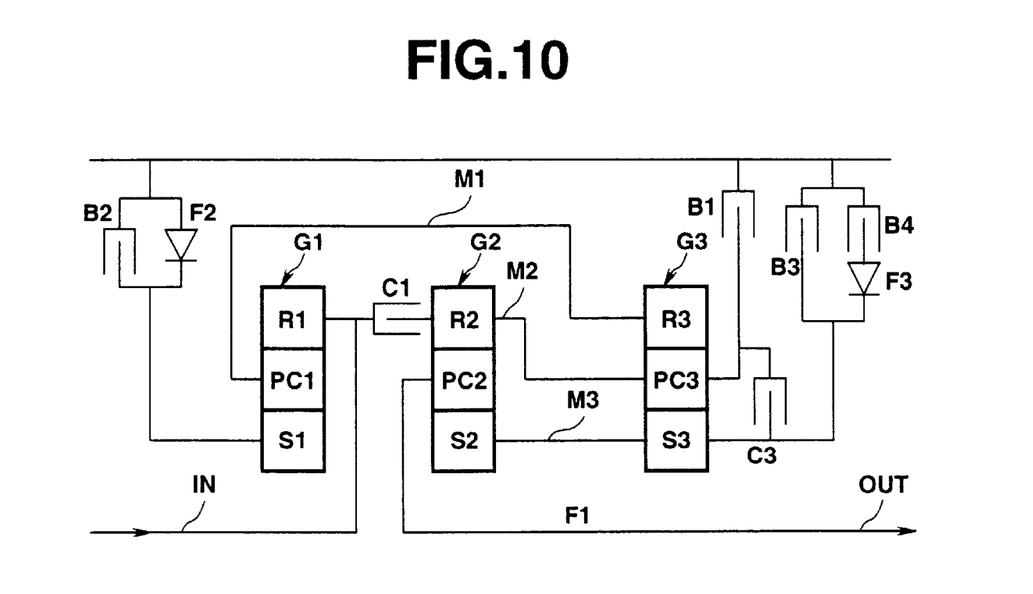
FIG. 10 is a diagrammatic view of a speed change gear mechanism which is a second embodiment of the present invention.
Figure 17:
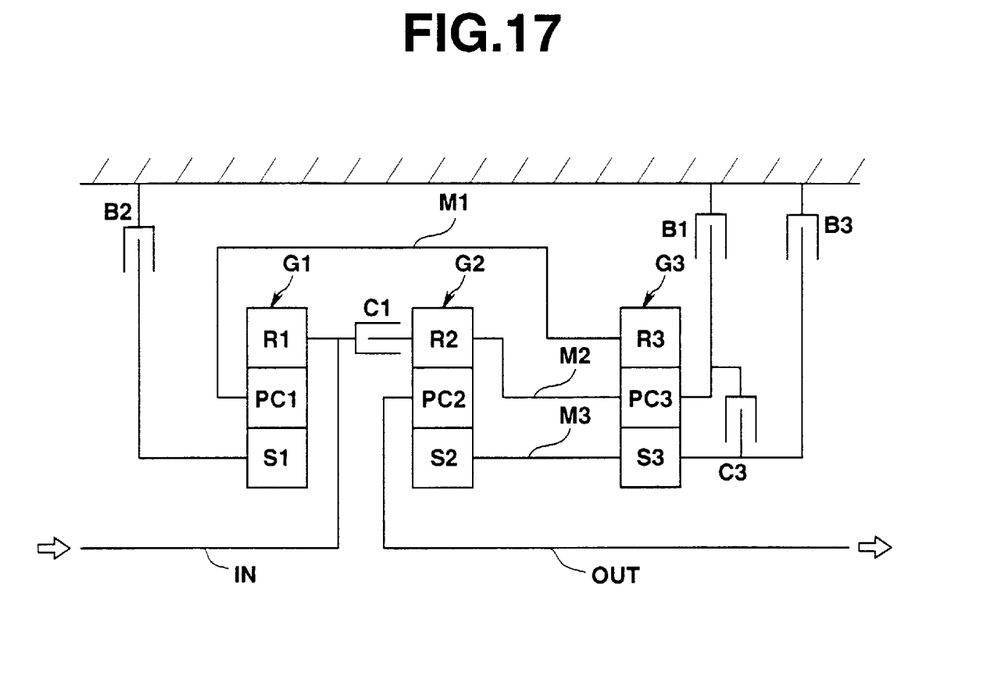
FIG. 17 is a view similar to FIG. 1, but showing only absolutely necessary engaging elements of the second embodiment.

Referring to FIGS. 10 and 17, there is shown in diagrammatic form a speed change gear mechanism of an automatic transmission, which is a second embodiment of the present invention. It is to be noted that FIG. 17 shows only absolutely necessary-engaging elements of the second embodiment. The speed change gear mechanism of this embodiment provides four forward speed modes and one reverse mode.

Since the second embodiment is similar in construction to the above-mentioned first embodiment, only parts or portions which are different from those of the first embodiment will be described in the following.

That is, as is seen from FIG. 10, in the second embodiment, a third direct connecting member M3 is employed in place of the parallel arrangement constructed by the second clutch C2 and the first one-way clutch F1 (see FIG. 1) of the first embodiment. That is, in the second embodiment, the second sun gear S2 and the third sun gear S3 are integrally connected. As shown in the TABLE of FIG. 11, the number of the engaging elements is eight in total.

In the following, operation of the second embodiment will be described with reference to FIGS. 11 to 16 of the drawings. FIG. 11 is an ELEMENT ON/OFF CONDITION TABLE showing ON/OFF condition of each engaging element established in various operation modes of the gear mechanism. It is to be noted that black circles in the TABLE indicate a condition of the corresponding element wherein ON operation of the element does not contribute a practical power transmission being carried out in a direction from the input shaft IN to the output shaft OUT. FIG. 12 is an ELEMENT SPEED DIAGRAM showing rotation speed of each rotatable member under various operation modes of the gear mechanism. In FIGS. 13 to 16, operative paths (viz., operative gear train) are illustrated by heavy lines.

Figure 11:
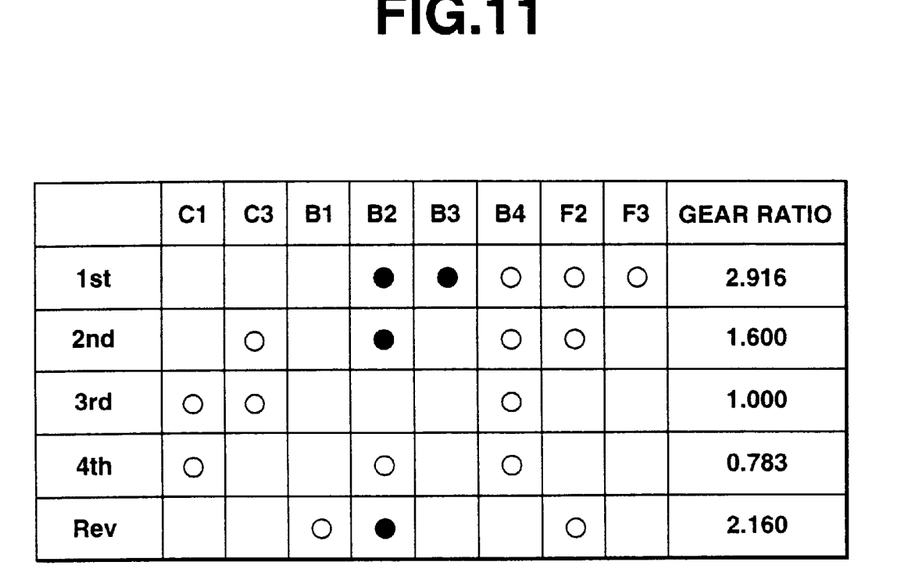
FIG. 11 is an ELEMENT ON/OFF CONDITION TABLE showing ON/OFF condition of each engaging element of the speed change gear mechanism of the second embodiment under various operation modes of the mechanism.
Figure 12:
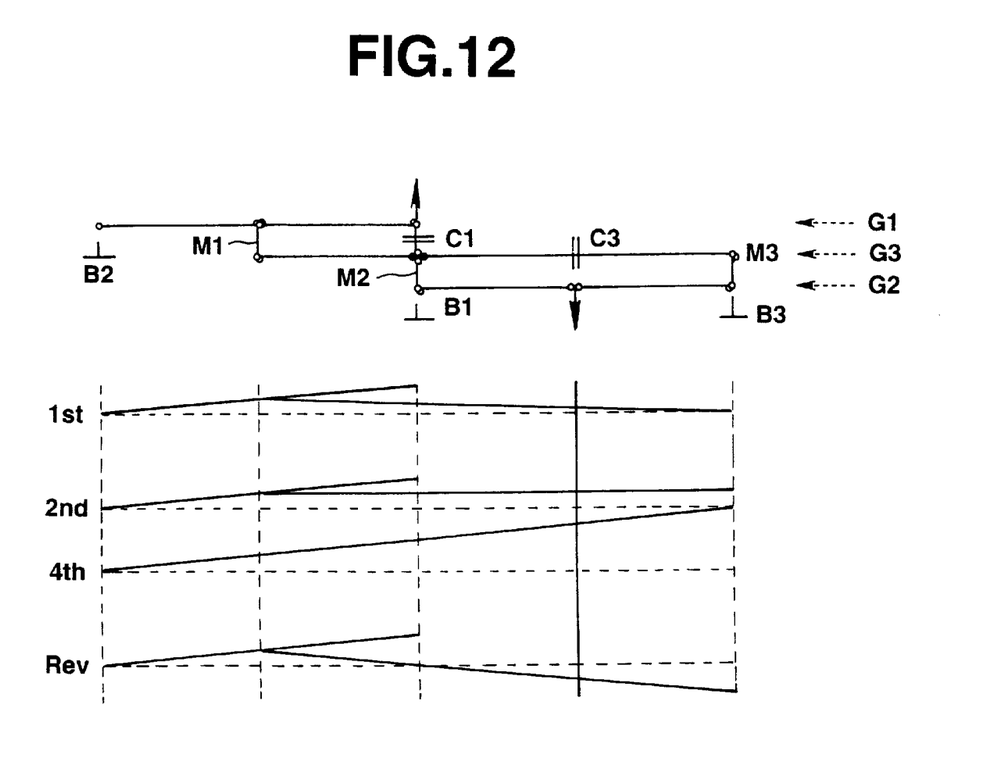
FIG. 12 is an ELEMENT SPEED DIAGRAM showing rotation speed of each rotatable member of the speed change gear mechanism of the second embodiment under various operation modes of the mechanism.

As is seen from the TABLE of FIG. 11, in a first forward speed mode, the second, third and fourth brakes B2, B3 and B4 are in their engaged (or ON) conditions.

Figure 13:
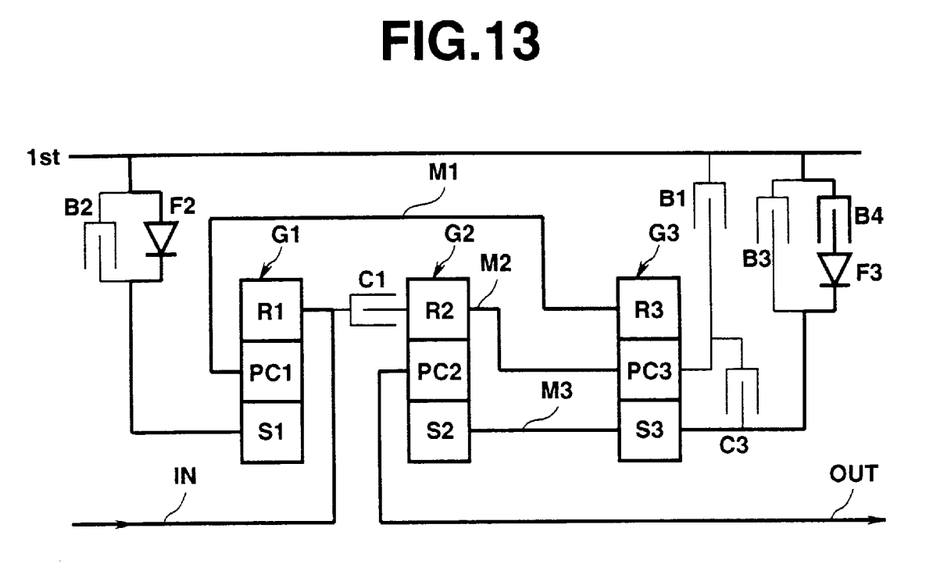
FIG. 13 is a view similar to FIG. 10, but showing a torque transmitting path established in a first forward speed mode of the second embodiment.

As is understood from FIGS. 12 and 13, in this first forward speed mode, due to ON-operation of the second one-way clutch F2 or engagement of the second brake B2, the first sun gear S1 is fixed to the transmission case, and due to releasement of the first clutch C1, engagement between the first ring gear R1 and the second ring gear R2 is canceled. Furthermore, due to engagement of the fourth brake B4 and ON-operation of the third one-way clutch F3 or due to engagement of the third brake B3, the second and third sun gears S2 and S3 are fixed to the transmission case.

Accordingly, rotation of the output shaft OUT is controlled by the rotation of the second ring gear R2 and the fixed condition of the second sun gear S2. It is to be noted that rotation speed of the second ring gear R2 is lower than that of the first direct connecting member M1. That is, in this condition, a great speed reduction is applied to the input rotation to provide the first forward speed.

As is seen from the TABLE of FIG. 11, a second forward speed mode is obtained from the first forward speed mode by releasing the third brake B3 and engaging the third clutch C3. As is understood from FIGS. 12 and 14, in this second forward speed mode, due to ON-operation of the second one-way clutch F2 or engagement of the second brake B2, the first sun gear S1 is fixed to the transmission case, and due to releasement of the first clutch C1, engagement between the first ring gear R1 and the second ring gear R2 is canceled. Furthermore, due to engagement of the third clutch C3, the second and third planetary gear units G2 and G3 form a block and thus rotate integrally.

Figure 14:
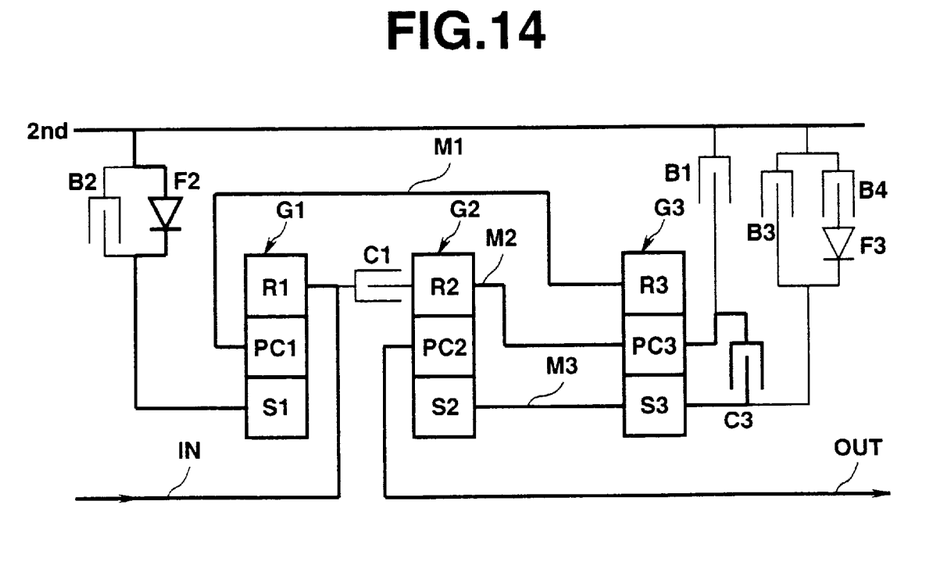
FIG. 14 is a view similar to FIG. 1, but showing a torque transmitting path established in a second forward speed mode of the second embodiment.

Accordingly, rotation of the output shaft OUT is controlled to the level of the first direct connecting member M1 by the rotation of the second ring gear R2 and the rotation of the second sun gear S2. It is to be noted that the rotation speed of the second ring gear R2 and that of the second sun gear 52 are the same as that of the first direct connecting member M1. That is, in this condition, a speed reduction is made by only the first planetary gear unit G1 to provide the second forward speed.

As is seen from the TABLE of FIG. 11, a third forward speed mode is obtained from the second forward speed mode by releasing the second brake B2 and engaging the first clutch C1. In this third forward speed mode, due to engagement of the first clutch C1, the first and second ring gears R1 and R2 are united. Furthermore, due to engagement of the third clutch C3, the second and third planetary gear units G2 and G3 form a block and thus integrally rotate.

Accordingly, direct connection between the input shaft IN and the output shaft OUT is established. Thus, in this condition, the third forward speed is obtained with a gear ratio being 1.000.

As is seen from the TABLE of FIG. 11, a fourth forward speed mode is obtained from the third forward speed mode by releasing the third clutch C3 and engaging the second brake B2. As is seen from FIGS. 12 and 15, in this fourth forward speed mode, due to engagement of the second brake B2 or ON-operation of the second one-way clutch F2, the first sun gear S1 is fixed to the transmission case, and due to engagement of the first clutch C1, the first and second ring gears R1 and R2 are united.

Figure 15:
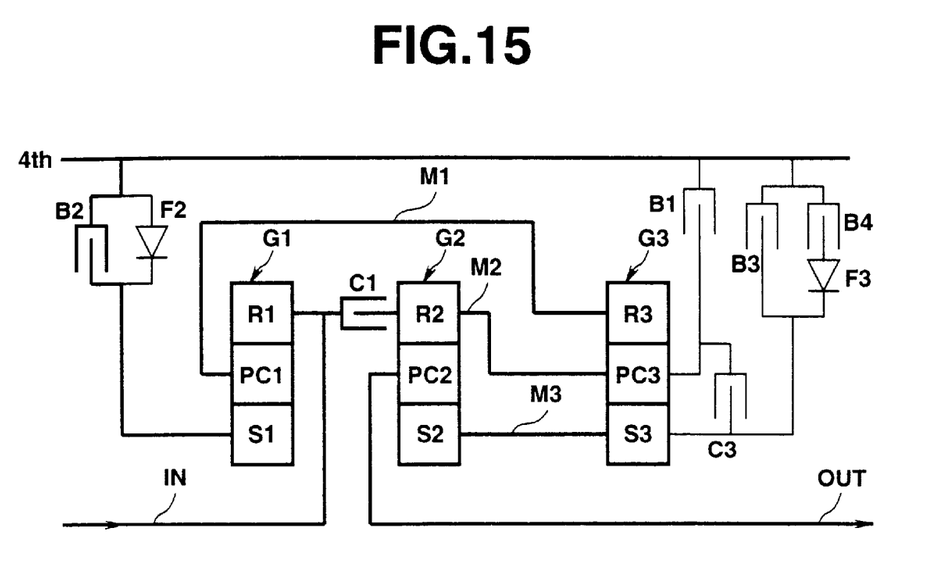
FIG. 15 is a view similar to FIG. 1, but showing a torque transmitting path established in a fourth forward speed mode of the second embodiment.

Accordingly, rotation of the output shaft OUT is controlled by the rotation of the second ring gear R2 and the rotation of the second sun gear S2. It is to be noted that the rotation speed of the second ring gear R2 is the same as that of the input shaft IN and the rotation speed of the second sun gear S2 is higher than that of the input shaft IN. Thus, in this condition, a speed acceleration is applied to the input rotation to provide the fourth forward speed.

As is seen from the TABLE of FIG. 11, a reverse mode is provided by engaging the first brake B1 and the second brake B2. As is seen from FIGS. 12 and 16, in this reverse mode, due to ONoperation of the second one-way clutch F2 or engagement of the second brake B2, the first sun gear S1 is fixed to the transmission case, and due to releasement of the first clutch C1, engagement between the first and second ring gears R1 and R2 is canceled. Furthermore, due to engagement of the first brake B1, the second direct connecting member M2 is fixed to the transmission case.

Figure 16:
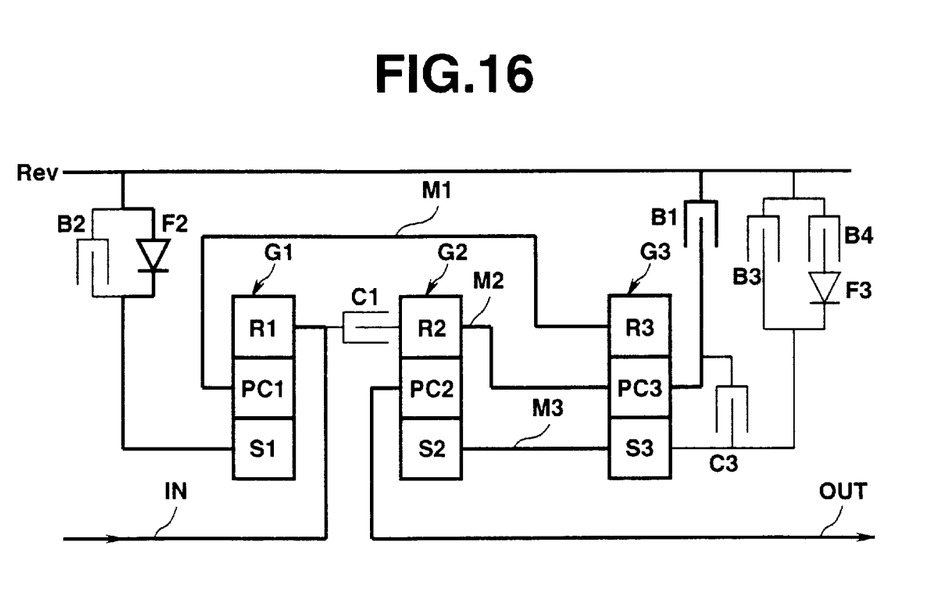
FIG. 16 is a view similar to FIG. 1, but showing a torque transmitting path established in a reverse mode of the second embodiment.

Accordingly, rotation of the output shaft OUT is controlled by the fixed condition of the second ring gear R2 and a reversed rotation of the second sun gear S2. Thus, in this condition, the is output shaft OUT is rotated in a reversed direction thereby to provide the reverse mode.

When the gear ratios α1, α2 and α3 of the first, second and third planetary gear units G1, G2 and G3 are set to 0.6, 0.35 and 0.35 respectively, the gear ratios for the first, second, third and fourth forward speed modes and one reverse mode become 2.916, 1.600, 1.000, 0.783 and 2.160 respectively. These values are practical gear ratios in a speed change gear of automatic transmissions.

In the following, advantages of the above-mentioned second embodiment will be described.

First, the number of engaging elements used is relatively small. That is, as is understood from FIGS. 10, 11 and 17, in this embodiment, the number of engaging elements which are absolutely necessary is five, which are the elements C1, C3, B1, B2 and B3 (see FIG. 17), and the number of engaging elements which are added for simplifying control of the speed change operation is three, which are the elements B4, F2 and F3. That is, the four forward speed modes and one reverse mode are obtained with only eight engaging elements in total. Thus, the size, weight and cost of the gear mechanism can be reduced to satisfied ones. The planetary gear units G1, G2 and G3 used in this second embodiment are of a single pinion type, which brings about a lighter weight of the gear mechanism. All of the ring gears R1, R2 and R3 of the three planetary gear units G1, G2 and G3 serve as power input means, which brings about a compact construction of the gear mechanism for the reason as has been mentioned hereinabove. If electronically controlled hydraulic actuators are used for adjusting the gear change timings, the three elements B4, F2 and F3 or at least some of them can be removed. FIG. 17 shows the gear mechanism including only the absolutely necessary engaging elements C1, C3, B1, B2 and B3.

Second, the speed change operation of the gear mechanism is smoothly achieved. That is, also in this second embodiment, undesired double switch operation is not used.

What is claimed is:

1. A speed change gear mechanism of an automatic transmission comprising:

a first planetary gear unit including a first sun gear, a first ring gear, a first single pinion meshed with both the first sun gear and said first ring gear and a first pinion carrier for carrying said first single pinion;

a second planetary gear unit including a second sun gear, a second ring gear, a second single pinion meshed with both the second sun gear and said second ring gear and a second pinion carrier for carrying said second single pinion;

a third planetary gear unit including a third sun gear, a third ring gear, a third single pinion meshed with both the third sun gear and said third ring gear and a third pinion carrier for carrying said third single pinion;

a first direct connecting member for integrally connecting said first pinion carrier and said third ring gear;

a second direct connecting member for integrally connecting said second ring gear and said third pinion carrier;

a first clutch for selectively establishing and canceling a united connection between said first ring gear and said second ring gear;

power transmitting means for establishing a united connection between said second sun gear and said third sun gear;

a third clutch for selectively establishing and canceling a united connection between said third sun gear and said third pinion carrier;

a first brake for selectively stopping and permitting a rotation of said second direct connecting member;

a second brake for selectively stopping and permitting a rotation of said fist sun gear;

a third brake for selectively stopping and permitting a rotation of said second sun gear;

an input shaft connected to said first ring gear to rotate therewith; and an output shaft connected to said second pinion carrier to rotate therewith.

2. A speed change gear mechanism as claimed in claim 1, in which said power transmitting means is a second clutch for selectively establishing and canceling the united connection between said second sun gear and said third sun gear.

3. A speed change gear mechanism as claimed in claim 1, in which said power transmitting means is a third direct connecting member which integrally connects said second sun gear and said third sun gear.

4. A speed change gear mechanism as claimed in claim 2, further comprising:

a first one-way clutch arranged in parallel with said second clutch;

a second one-way clutch arranged in parallel with said second brake; and a series arrangement including a third one-way clutch and a fourth brake, said series arrangement being arranged in parallel with said third brake.

5. A speed change gear mechanism as claimed in claim 2, further comprising gear change control means, so that a first forward speed mode is obtained when said second clutch, said second brake and said third brake are each engaged, a second forward speed mode is obtained when said third clutch, said second brake and said third brake are each engaged, a third forward speed mode is obtained when said second clutch, said third clutch and said second brake are each engaged, a fourth forward speed mode is obtained when said first clutch, said second clutch and said third clutch are each engaged, a fifth forward speed mode is obtained when said first clutch, said second clutch and said second brake are each engaged, and a reverse mode is obtained when said second clutch, said first brake and said second brake are each engaged.

6. A speed change gear mechanism as claimed in claim 2, in which gear ratios of said first, second and third planetary gear units are set to a common value.

7. A speed change gear mechanism as claimed in claim 3, further comprising:

a second one-way clutch arranged in parallel with said second brake; and a series arrangement including a third one-way clutch and a fourth brake, said series arrangement being arranged in parallel with said third brake.

8. A speed change gear mechanism as claimed in claim 3, further comprising gear change control means, so that a first forward speed mode is obtained when said second brake and said third brake are each engaged, a second forward speed mode is obtained when said third clutch and said second brake are each engaged, a third forward speed mode is obtained when said first clutch and said third clutch are each engaged, a fourth forward speed mode is obtained when said first clutch and said second brake are each engaged and a reverse mode is obtained when said first brake and said second brake are each engaged.

9. A speed change gear mechanism as claimed in claim 2, further comprising means for constantly engaging said second clutch thereby to constantly establishing the united connection between said second sun gear and said third sun gear.

10. A speed change gear mechanism as claimed in claim 9, further comprising gear change control means, so that a first forward speed mode is obtained when said second brake and said third brake are each engaged, a second forward speed mode is obtained when said third clutch and said second brake are each engaged, a third forward speed mode is obtained when said first clutch and said third clutch are each engaged, a fourth forward speed mode is obtained when said first clutch and said second brake are each engaged and a reverse mode is obtained when said first brake and said second brake are each engaged.

11. A speed change gear mechanism as claimed in claim 4, further comprising gear change control means, so that a first forward speed mode is obtained when said second clutch, said second brake and said third brake are each engaged, a second forward speed mode is obtained when said third clutch, said second brake and said third brake are each engaged, a third forward speed mode is obtained when said second clutch, said third clutch and said second brake are each engaged, a fourth forward speed mode is obtained when said first clutch, said second clutch and said third clutch are each engaged, a fifth forward speed mode is obtained when said first clutch, said second clutch and said second brake are each engaged, and a reverse mode is obtained when said second clutch, said first brake and said second brake are each engaged.

12. A speed change gear mechanism as claimed in claim 4, in which gear ratios of said first, second and third planetary gear units are set to a common value.

13. A speed change gear mechanism as claimed in claim 7, further comprising gear change control means, so that a first forward speed mode is obtained when said second brake and said third brake are each engaged, a second forward speed mode is obtained when said third clutch and said second brake are each engaged, a third forward speed mode is obtained when said first clutch and said third clutch are each engaged, a fourth forward speed mode is obtained when said first clutch and said second brake are each engaged and a reverse mode is obtained when said first brake and said second brake are each engaged.

14. A speed change gear mechanism as claimed in claim 4, further comprising means for constantly engaging said second clutch thereby to constantly establish the united connection between said second sun gear and said third sun gear.

* * * * *